United States Patent
Abe

(10) Patent No.: US 7,400,341 B2
(45) Date of Patent: Jul. 15, 2008

(54) ELECTRONIC ENDOSCOPE APPARATUS WHICH SUPERIMPOSES SIGNALS ON POWER SUPPLY

(75) Inventor: Kazunori Abe, Saitama (JP)

(73) Assignee: FUJINON Corporation, Saitama (JP)

( * ) Notice: Subject to any disclaimer, the term of this patent is extended or adjusted under 35 U.S.C. 154(b) by 0 days.

(21) Appl. No.: 11/723,095

(22) Filed: Mar. 16, 2007

(65) Prior Publication Data

US 2007/0159526 A1 Jul. 12, 2007

Related U.S. Application Data

(62) Division of application No. 10/619,113, filed on Jul. 15, 2003, now Pat. No. 7,248,281.

(30) Foreign Application Priority Data

| Jul. 16, 2002 | (JP) | ............................. 2002-206536 |
| Jul. 24, 2002 | (JP) | ............................. 2002-214702 |
| Aug. 29, 2002 | (JP) | ............................. 2002-250406 |

(51) Int. Cl.
*A62B 1/04* (2006.01)
*H04N 7/18* (2006.01)
*H04N 9/47* (2006.01)

(52) U.S. Cl. .................. 348/65; 396/17; 600/160
(58) Field of Classification Search .............. 348/65; 340/538, 310.11; 455/402; 725/79; 396/17; 600/160

See application file for complete search history.

(56) References Cited

U.S. PATENT DOCUMENTS

| 5,467,124 A | * | 11/1995 | Tamburrino et al. ............ 348/66 |
| 5,625,863 A | * | 4/1997 | Abraham ....................... 725/79 |
| 5,984,860 A | * | 11/1999 | Shan ........................... 600/116 |
| 6,043,839 A | * | 3/2000 | Adair et al. .................... 348/76 |
| 6,091,453 A | * | 7/2000 | Coan et al. .................... 348/373 |
| 6,812,970 B1 | * | 11/2004 | McBride ....................... 348/372 |
| 7,133,063 B2 | * | 11/2006 | Abe .............................. 348/65 |

* cited by examiner

*Primary Examiner*—Gims Philippe
*Assistant Examiner*—Erick Rekstad
(74) *Attorney, Agent, or Firm*—Birch, Stewart, Kolasch & Birch, LLP

(57) ABSTRACT

An electronic endoscope apparatus has a single coaxial cable installed between a scope A and a processor unit B. Waveform superimposing circuits superimpose a video signal on power transmitted through the coaxial cable and sequentially superimpose scope-side reference pulses and processor-side reference pulses alternately on horizontal scanning blanking periods in one field of the video signal. At the same time, the scope A and processor unit B generate reference signals and various timing signals synchronized with the reference pulses of the counterpart and perform video processing based on them. This enables accurate sampling even when scopes with different pixel counts are used. Also, a scope information signal and electronic shutter control signal may be superimposed on a predetermined blanking period in the video signal. Alternatively, an electromagnetic coupler may be installed instead of the coaxial cable and the video signal and reference pulses may be superimposed on AC power supplied electromagnetically.

4 Claims, 11 Drawing Sheets

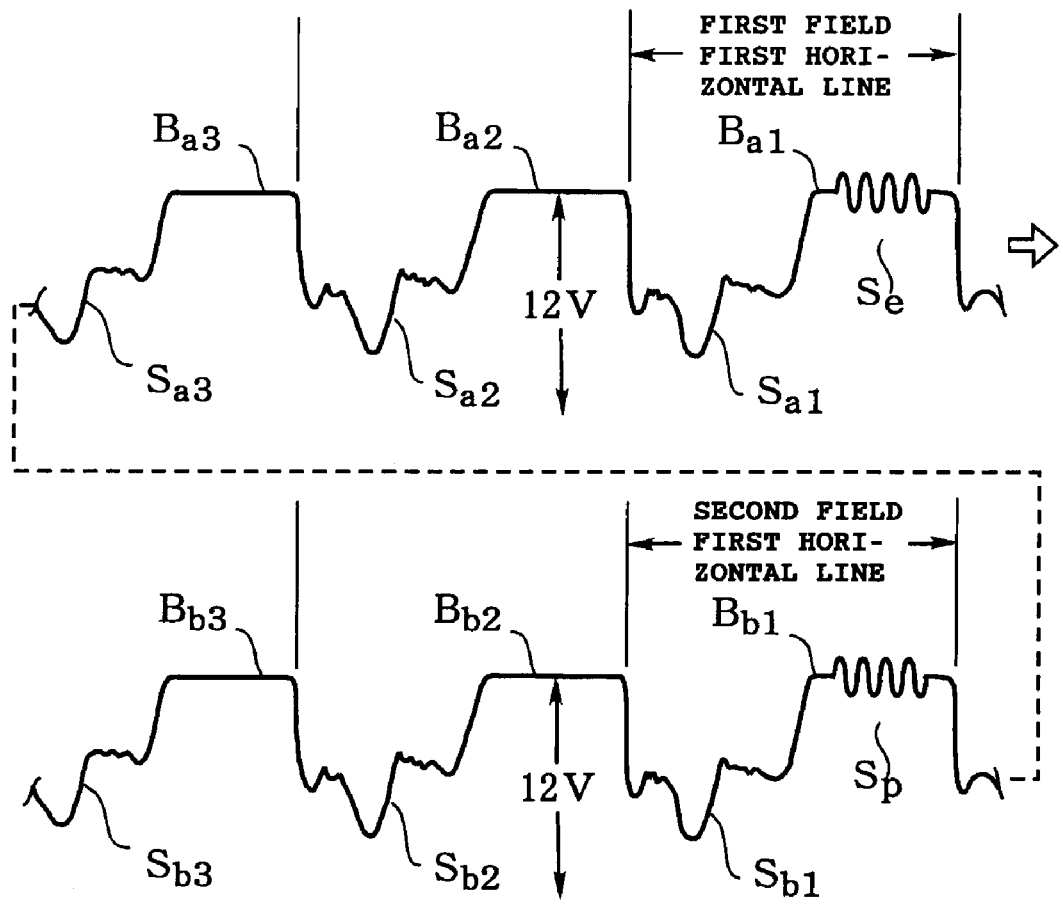

CCD OUTPUT

SAMPLE/HOLD
OUTPUT

ELECTRONIC ENDOSCOPE APPARATUS WHICH SUPERIMPOSES SIGNALS ON POWER SUPPLY

This application claims the priority of Japanese Patent Applications Nos. 2002-206536 filed on Jul. 16, 2002, 2002-214702 filed on Jul. 24, 2002, and 2002-250406 filed on Aug. 29, 2002 as well as U.S. patent application Ser. No. 10/619,113 filed on Jul. 15, 2003, now U.S. Pat. No. 7,248,281 which are incorporated herein by reference.

BACKGROUND OF THE INVENTION

1. Field of the Invention

The present invention relates to an electronic endoscope apparatus. More particularly, it relates to a configuration for supplying power and video signals between an electronic endoscope which is a scope and a processor unit which is connected with the electronic endoscope as well as for sampling the image signal properly.

2. Description of the Related Art

In an electronic endoscope apparatus, an electronic endoscope equipped, for example, with a CCD (Charge Coupled Device) which is a solid-state image sensor is connected to a processor unit via a cable and connector. Through these cable and connector, power is supplied and various control signals are transmitted from the processor unit to the scope while a video signal and various control signals are transmitted from the scope to the processor unit.

Thus, the scope is driven by DC power supplied from the processor unit via a power line while a video signal picked up by the CCD of the scope is transmitted to the processor unit via a signal line (transmission line). As the processor unit performs various types of color video processing on the video signal, images of the object under observation are displayed on a monitor.

However, with the electronic endoscope apparatus described above, the cable connecting the scope with the processor unit contains a power line and a plurality of signal lines. Consequently, the connector of the cable has a multi-pin architecture, which may cause bad connections or breakage of some connection pins in addition to being expensive.

Recently, CCDs equipped with scopes have been growing in pixel count. This requires an ability to connect various scopes equipped with CCDs which have increased but different pixel counts to a common processor unit. To deal with this situation, each scope and the processor unit are equipped with oscillators which differ in frequency according to pixel counts, clock signals are approximated by dividing oscillation frequencies or the like, and processing timings in video processing are synchronized between the scope and processor unit. However, when sampling pixel signals outputted from a CCD, in particular, a slight difference in processing timing between the scope and processor unit will make it impossible to obtain a proper video signal.

FIGS. 13, 14A and 14B show configuration and operation of a sampling circuit. A CCD 1 mounted on the scope is connected, for example, with a correlated double sampling circuit 2. The sampling circuit 2 has a sampler 3 and holder 4 and its operation is controlled based on timing pulses (sampling pulses) which are output from a synchronizing signal generator (SSG) 5 and synchronized with operating timing of the CCD 1. For example, output of the CCD 1 is a signal which falls on a pixel-by-pixel basis as indicated by a horizontal line signal in FIG. 14A, and when the signal passes through the sampling circuit 2, its pixel-by-pixel amplitude is held as shown in FIG. 14B and an amplitude envelope of the CCD output shown in FIG. 14A is extracted as a video signal.

However, if there is a phase difference between the timing pulses outputted from the synchronizing signal generator 5 and the timing pulses outputted (read) from the CCD 1, it becomes impossible to accurately pickup the amplitude of sampled pixel signals, resulting in an inability to obtain a proper video signal. Such a phase difference can occur due to temperature conditions, the length of the electronic endoscope (the length of transmission channel), etc. even when oscillators with the same frequencies are used.

Furthermore, electronic endoscope apparatus are sometimes provided with an electronic shutter function which controls brightness of video by adjusting charge accumulation time of the CCD 1. It is necessary for an electronic endoscope apparatus to implement the electronic shutter function to work.

The present invention has been made in view of the above problems. Its object is to provide an electronic endoscope apparatus which can use a common line for power supply and signal transmission, connect a scope and processor unit using a minimal number of lines, and form images in good condition by means of accurate sampling even when scopes equipped with CCDs with different pixel counts are connected to a common processor unit as well as can easily implement an electronic shutter function.

SUMMARY OF THE INVENTION

To achieve the above object, a first invention provides an electronic endoscope apparatus comprising: an electronic endoscope equipped with an image pickup device; a main unit which is connected with the electronic endoscope and includes a processor unit; a sample/hold circuit which samples and holds a video signal obtained by the image pickup device; a common power/signal line which connects the electronic endoscope with the main unit; a power supply circuit which is installed in the main unit and supplies power to the electronic endoscope via the common power/signal line; a scope-side waveform superimposing circuit which superimposes a video signal obtained by the image pickup device on the power transmitted through the common power/signal line and superimposes scope-side reference pulses on a plurality of horizontal scanning blanking periods in a field or frame of the video signal; a processor-side waveform superimposing circuit which superimposes processor-side reference pulses on a plurality of horizontal scanning blanking periods that exist in a field (in the case of interlaced scanning) or frame (in the case of non-interlaced scanning) of the video signal supplied via the common power/signal line and that are not superimposed with the scope-side reference pulses; a processor-side separating circuit which separates the video signal and scope-side reference pulses superimposed on the common power/signal line; a processor-side synchronizing signal generator which forms a signal synchronized with the scope-side reference pulses outputted from the processor-side separating circuit; a scope-side separating circuit which separates the processor-side reference pulses superimposed on the common power/signal line; and a scope-side timing generator (which functions as a synchronizing signal generating circuit) which forms a signal synchronized with the processor-side reference pulses outputted from the scope-side separating circuit. In short, the scope-side reference pulses and processor-side reference pulses are superimposed alternately on the blanking periods in one field or one frame of the video signal.

In the first invention, oscillation frequency of an oscillator installed in the processor-side synchronizing signal generator may differ from oscillation frequency of an oscillator installed in the scope-side timing generator.

In the first invention, configured as described above, the electronic endoscope and the processor unit are connected, for example, by a single coaxial cable (or two electric wires including a ground wire), power is supplied from the processor unit to the electronic endoscope via the coaxial cable serving as the common power/signal line, and the video signal is transmitted from the electronic endoscope to the processor unit with its waveform superimposed on the power (power supply level) transmitted through the common power/signal line.

A scope-side clock signal of approximately ten pulses is superimposed as the scope-side reference pulses on the blanking period (or optical black level period) of the first horizontal (scanning) line signal in a field (or a frame in the case of non-interlaced scanning) of the video signal, a processor-side clock signal of approximately ten pulses is superimposed as the processor-side reference pulses on the blanking period of the second horizontal (scanning) line signal, and subsequently the scope-side reference pulses and processor-side reference pulses are superimposed alternately. Conversely, it is also possible to superimpose the processor-side reference pulses first and then superimpose the scope-side reference pulses.

For example, if the electronic endoscope is equipped with a 270,000-pixel image pickup device while the processor unit is configured to handle 410,000-pixel image pickup devices as standard, the electronic endoscope uses a clock signal with an oscillation frequency of 19.0632 MHz while the processor unit uses a clock signal with an oscillation frequency of 28.6363 MHz, and thus the pulse with a frequency of 19.0909 MHz obtained by dividing the frequency of 28.6363 MHz at a ratio of 2/3 is superimposed as the processor-side reference pulses.

Simultaneously with the superimposing process described above, a clock signal is formed in synchronization with the scope-side reference pulses by PLL operation in the processor unit while a clock signal is formed in synchronization with the processor-side reference pulses by PLL operation in the electronic endoscope. The synchronized clock signals are output as the next reference signals. Various timing signals formed based on the synchronized clock signals are used in the processing of the video signal. In this way, as reference pulses synchronized with each other in one field or one frame are sequentially transmitted alternately, well synchronized timing signals are generated, allowing the video signal to be sampled properly.

In the first invention, a crystal oscillator may be installed in one of the processor-side synchronizing signal generator and the scope-side timing generator and an LCR oscillator may be installed in the other of them. By using the LCR oscillator, which has a wider Q-value range than the crystal oscillator, it is possible to perform synchronizing operations automatically even if there is a large phase shift and achieve proper synchronization by overcoming phase difference even if the electronic endoscope and processor unit are equipped with oscillators which differ in frequency.

A second invention provides an electronic endoscope apparatus comprising: an electronic endoscope equipped with an image pickup device; a main unit which is connected with the electronic endoscope and includes a processor unit; a common power/signal line which connects the electronic endoscope with the main unit; a power supply circuit which is installed in the main unit and supplies power to the electronic endoscope via the common power/signal line; a scope-side waveform superimposing circuit which superimposes a video signal obtained by the image pickup device on power transmitted through the common power/signal line and superimposes an information signal about the electronic endoscope on a predetermined blanking period in the video signal; a processor-side separating circuit which separates the video signal and the information signal about the electronic endoscope superimposed on the common power/signal line; and a signal processing circuit which performs various types of processing on the video signal based on the information signal about the electronic endoscope obtained from the processor-side separating circuit.

The second invention may comprise: an electronic shutter circuit which controls charge accumulation time in the image pickup device as electronic shutter speed; a processor-side waveform superimposing circuit which superimposes a electronic shutter control (or exposure control) signal on a predetermined blanking period in the video signal supplied through the common power/signal line; and a scope-side separating circuit which separates the electronic shutter control signal superimposed on the common power/signal line.

The scope-side waveform superimposing circuit may superimpose scope-side reference pulses on a blanking period of the first horizontal line in the first field or first frame of the video signal and superimpose the information signal about the electronic endoscope on predetermined blanking periods of the second and later horizontal lines in the first field or first frame while the processor-side waveform superimposing circuit may superimpose the electronic shutter control signal on a predetermined blanking period in the second or later field or frame of the video signal.

According to the second invention, the video signal waveform-superimposed on power transmitted through the common power/signal line is superimposed, in turn, with scope-side reference pulses during a blanking period of, for example, the first horizontal line signal in the first field or first frame of the video signal and with the information signal (e.g., 8-bit data) about the electronic endoscope during blanking periods of the second and later horizontal lines. The information signal about the electronic endoscope may include various types of information about, for example, the type of electronic endoscope, pixel count of the image pickup device, processing of color signals, etc.

The processor unit separates and extracts the scope-side reference pulses and the information signal about the electronic endoscope, forms a clock signal in synchronization with the scope-side reference pulses, inputs the information signal about the electronic endoscope in a microcomputer, and performs image processing based on this information.

Also, the processor unit measures the brightness of video and superimposes a control signal (e.g., 8-bit data) for the electronic shutter speed on blanking periods of, for example, the second and later horizontal lines in the second field over the transmitted power to adjust charge accumulation time (exposure time) of the image pickup device based on the measured brightness. The electronic shutter speed control signal is separated and extracted in the electronic endoscope and supplied to the electronic shutter circuit which is used to control the charge accumulation time (electronic shutter speed) of the image pickup device.

A third invention provides an electronic endoscope apparatus comprising: an electromagnetic coupler which is installed instead of the common power/signal line and connects the electronic endoscope and the main unit electromagnetically; and a power supply circuit which is installed in the main unit and supplies AC power to the electronic endoscope via the electromagnetic coupler, wherein the video signal, scope-side reference pulses, and processor-side reference pulses are superimposed on the AC power.

According to the third invention, the electronic endoscope and processor unit are coupled electromagnetically without electric wires. Through the electromagnetic coupling, AC power is supplied from the processor unit to the electronic endoscope while the video signal is transmitted from the electronic endoscope to the processor unit with its waveform superimposed on the AC power. The video signal is superimposed with the scope-side reference pulses or processor-side reference pulses. Consequently, the electronic endoscope and processor unit process the video signal properly based on clock signals synchronized with the reference pulses.

BRIEF DESCRIPTION OF THE DRAWINGS

FIG. 6 is a diagram showing how transmission signals are superimposed on transmitted power by a waveform superimposing circuit according to the second embodiment;

FIG. 7 is a diagram showing scope information data stored in an EEPROM according to the second embodiment;

DETAILED DESCRIPTION OF THE PREFERRED EMBODIMENTS

First Embodiment

Figure 1:
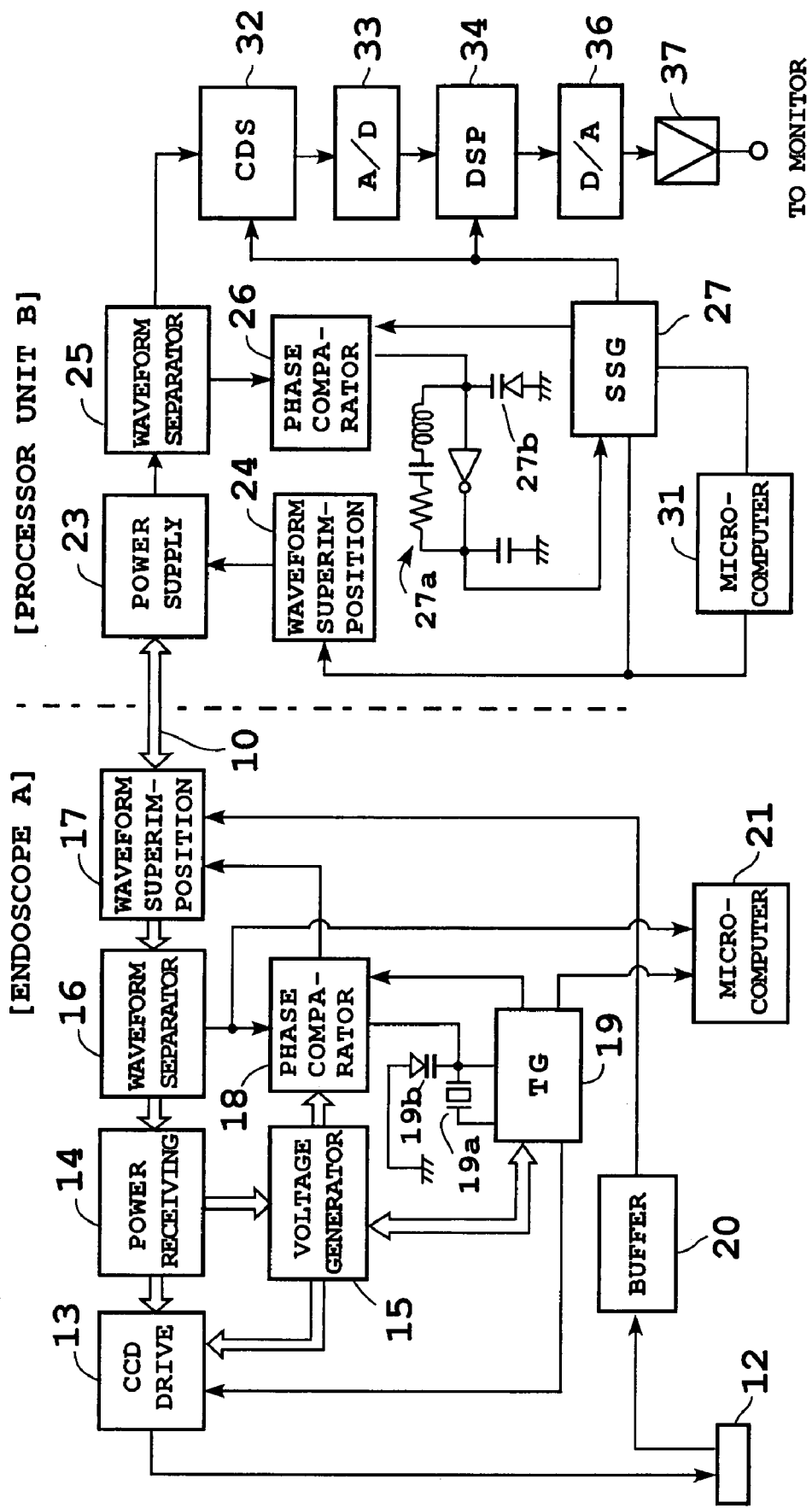
FIG. 1 is a block diagram showing configuration of an electronic endoscope apparatus according to a first embodiment of the present invention.
Figure 2:
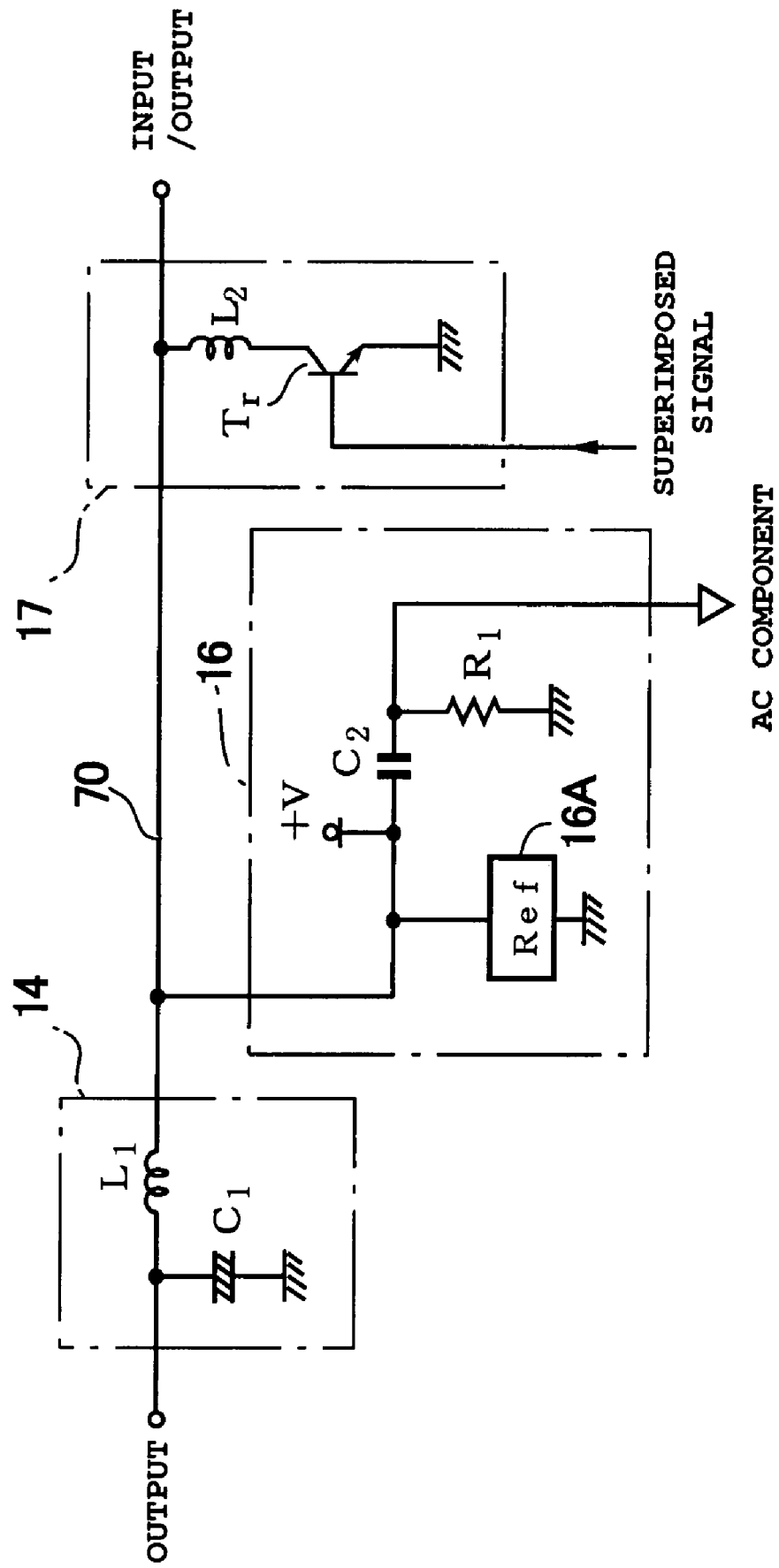
FIG. 2 is a diagram showing a concrete configuration of a power receiving circuit, waveform separating circuit, and waveform superimposing circuit according to the first embodiment and a second embodiment.

FIGS. 1 and 2 show configuration of an electronic endoscope apparatus according to a first embodiment. In FIG. 1, a scope A is connected to a processor unit by a single coaxial cable 10 which is a common power/signal line. The tip of the scope A is equipped with, for example, a 270,000-pixel CCD 12 and supplied with an illuminating beam (not shown) from a light source unit via a light guide.

The scope A comprises a CCD drive circuit 13 which drives the CCD 12, power receiving circuit 14 which feeds DC (direct current) power, switching regulator, etc. Also, it is equipped with a voltage generating circuit 15 which produces a plurality of supply voltages using power transmitted from the power receiving circuit 14; waveform separating circuit 16 which separates control signals and the like superimposed on the power transmitted through the coaxial cable 10; waveform superimposing circuit 17 which superimposes a waveform of a video signal (interlaced scanning) and control signal on transmitted power and superimposes scope-side reference pulses on every other blanking period of horizontal line signals in one field of the video signal in such a way as to alternate with processor-side reference pulses (described later); phase comparator circuit 18 which compares the phase of an oscillatory signal with the phase of the processor-side reference pulses; and timing generator (TG) 19 which generates a clock signal (e.g., with a frequency of 19.0632 MHz) at the pixel level, horizontal synchronizing (HD) signal, vertical synchronizing (VD) signal, reset signal etc.

The timing generator 19 is equipped with a crystal oscillator 19a which oscillates at a frequency of 19.0632 MHz for driving the 270,000-pixel CCD 12 as well as with a variable-capacitance diode 19b. It also functions as a synchronizing signal generating circuit: it outputs a clock signal with the frequency of 19.0632 MHz as the scope-side reference pulses and also forms a PLL (Phase Locked Loop) in conjunction with the phase comparator circuit 18, and thereby generates a signal in synchronization with the processor-side reference pulses. The scope A is further equipped with a buffer 20 which stores output signals from the CCD 12, microcomputer 21 which generally controls various circuits of the scope A, etc.

The processor unit B comprises a power supply circuit 23 which supplies DC power to the scope A, waveform superimposing circuit 24 which superimposes control signals on transmitted power and superimposes the waveform of the processor-side reference pulses on every other blanking period of horizontal line signals in one field of the video signal in such a way as to alternate with the scope-side reference pulses, and a waveform separating circuit 25 which separates AC components—the video signal and scope-side reference pulses. Output of the waveform separating circuit 25 is input in a phase comparator circuit 26 and synchronizing signal generator (SSG) 27. The phase comparator circuit 26 compares the phase of the scope-side reference pulses with the phase of an oscillatory signal and generates a voltage proportional to the phase difference.

The synchronizing signal generator 27 comprises a known LCR oscillator 27a which is made up of a combination of L (coil), C (capacitor), and R (resister) and a variable-capacitance diode 27b. It generates, for example, a frequency of 28.6363 MHz for driving a 410,000-pixel CCD. It feeds the output voltage of the phase comparator circuit 26 to the junction of the LCR oscillator 27a and variable-capacitance diode 27b, forms a PLL (Phase Locked Loop), and thereby generates a clock signal, horizontal synchronizing (HD) signal, and vertical synchronizing (VD) signal in synchronization with the scope-side reference pulses. Also, the synchronizing signal generator 27 comprises a divider and obtains a frequency of 19.0909 MHz for the clock signal and processor-side reference pulses by dividing the oscillation frequency of 28.6363 MHz at a ratio of 2/3. Since the LCR oscillator 27a has a wide Q-value range, it is possible to perform synchronizing operations automatically even if there is a large phase shift and overcome phase difference between synchronizing signals even if the scope A and processor unit B are equipped with oscillators which differ in oscillation frequency.

Furthermore, the processor unit B comprises a microcomputer 31 which generally controls various circuits, correlated double sampling (CDS) circuit 32 which receives the video signal from the waveform separating circuit 25 and performs correlated double sampling, A/D converter 33, DSP (Digital Signal Processing) circuit 34 which performs various types of processing on the video signal to form color images, D/A converter 36, amplifier 37, etc.

FIG. 2 shows specific circuits of the scope A: the power receiving circuit 14, waveform separating circuit 16, and waveform superimposing circuit 17. The power receiving circuit 14 composes a smoothing circuit using a choke coil $L_1$ and a capacitor $C_1$, where the choke coil $L_1$ is connected in series with a power supply line 70 connected to the coaxial cable 10 and blocks high frequencies while the capacitor $C_1$ is connected in parallel with the power supply line 70. If a full-wave rectifier circuit is used for the power receiving circuit 14, more stable voltage can be ensured. The waveform separating circuit 16 comprises a reference voltage source (Ref.) 16A which provides a reference voltage in response to input from the power supply line 70, capacitor $C_2$ which extracts an AC (alternating current) component, and resistor $R_1$. It separates the AC component, i.e., the control signals supplied from the processor unit B, from the power supply line 70.

The waveform superimposing circuit 17, in turn, has a coil $L_2$ and a transistor Tr installed between the power supply line 70 and ground. The transistor Tr has its collector connected to one end of the coil $L_2$, its emitter connected to ground, and its base supplied with the video signal from the buffer 20 as a superimposed signal and with reference clock pulses from the timing generator 19. The configuration of the waveform superimposing circuit 17 and waveform separating circuit 16 similarly also applies to the waveform superimposing circuit 24 and the waveform separating circuit 25 of the processor unit B.

In the first embodiment, configured as described above, when the processor unit B is powered on, DC power of, for example, approximately 12 volts is supplied from the power supply circuit 23 to the scope A via the coaxial cable 10. On the other hand, in the scope A, the power receiving circuit 14 receives DC power from the power supply circuit 23, and then the voltage generating circuit 15 produces power supplies with predetermined voltages and provides them to various circuits.

Then, the DC power is supplied to the CCD drive circuit 13, which drives the CCD 12 to capture images of an object under observation. An image pickup signal (video signal) outputted from the CCD 12 is supplied to the waveform superimposing circuit 17 via the buffer 20, superimposed on the transmitted power (70) by the waveform superimposing circuit 17, and supplied to the processor unit B via the coaxial cable 10. In the meantime, under the control of the microcomputer 21, approximately ten reference pulses (clock signal) with a frequency of 19.0632 MHz are input in the waveform superimposing circuit 17 from the timing generator 19 and superimposed as a synchronizing signal repeatedly on blanking periods of a plurality of horizontal line signals in a field of the video signal.

Figure 3:
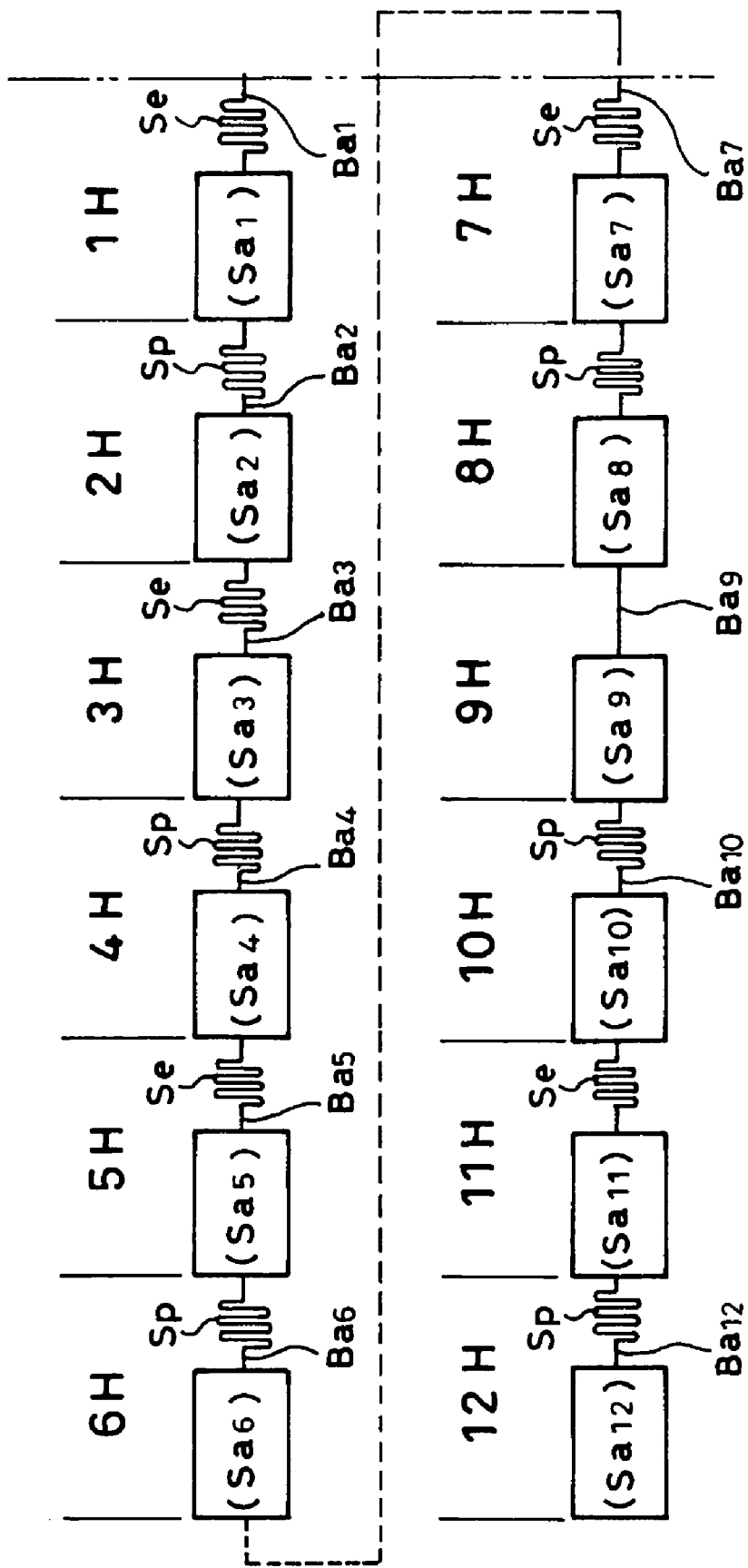
FIG. 3 is a diagram showing signals superimposed on transmitted power according to the first embodiment

FIG. 3 shows signals superimposed on power supplied via the coaxial cable 10. The transmitted power is superimposed with the video signal (rectangles represent the actual video signal) consisting of horizontal line (scanning) signals $S_{a1}$, $S_{a2}$, $S_{a3}$, ... in horizontal scanning periods 1H, 2H, 3H, ... on a field-by-field basis (in the case of interlaced scanning). Approximately ten 19.0632-MHz scope-side reference pulses Se are superimposed on the blanking periods $B_{a1}$, $B_{a3}$, $B_{a5}$, ... of, for example, horizontal line signals $S_{a1}$, $S_{a3}$, $S_{a5}$, ... in the field.

On the other hand, the waveform separating circuit 25 of the processor unit B separates an AC component supplied via the coaxial cable 10, extracts the video signal and the scope-side reference pulses Se, and supplies the scope-side reference pulses Se to the synchronizing signal generator 27 via the phase comparator circuit 26. The synchronizing signal generator 27 generates the processor-side reference pulses Sp with a frequency of 19.0909 MHz obtained by dividing the oscillation frequency of 28.6363 MHz of the LCR oscillator 27a at a ratio of 2/3. The phase comparator circuit 26 compares the reference pulses Sp with the scope-side reference pulses Se. Then, in the phase comparator circuit 26 and synchronizing signal generator 27, the PLL comes into action and the voltage applied to the variable-capacitance diode 27b changes, causing a clock signal to be generated in synchronization with the reference pulses Se (with a frequency of 19.0632 MHz) as well as causing timing signals such as a horizontal synchronizing signal and vertical synchronizing signal to be generated.

Looking at the reference pulses Se separated from the blanking period $B_{a1}$ of the horizontal line signal $S_{a1}$ described with reference to FIG. 3, the clock signal to be generated in synchronization with the reference pulses Se, which consists of approximately ten pulses, are superimposed for synchronization as the processor-side reference pulses Sp, for example, on the blanking period $B_{a2}$ of the horizontal line signal $S_{a2}$ in one field of the video signal as shown in FIG. 3. In this way, the scope A and processor unit B alternately transmit clock signals synchronized with the reference pulses of the counterpart as the reference pulse. Consequently, in the processor unit B, the reference, pulses Sp are superimposed on the blanking periods $B_{a2}$, $B_{a4}$, $B_{a6}$, of horizontal line signals $S_{a2}$, $S_{a4}$, $S_{a6}$, .... This two-way transmission of the reference pulses Se and Sp continues as long as the video signal is output from the scope A.

Figure 4:
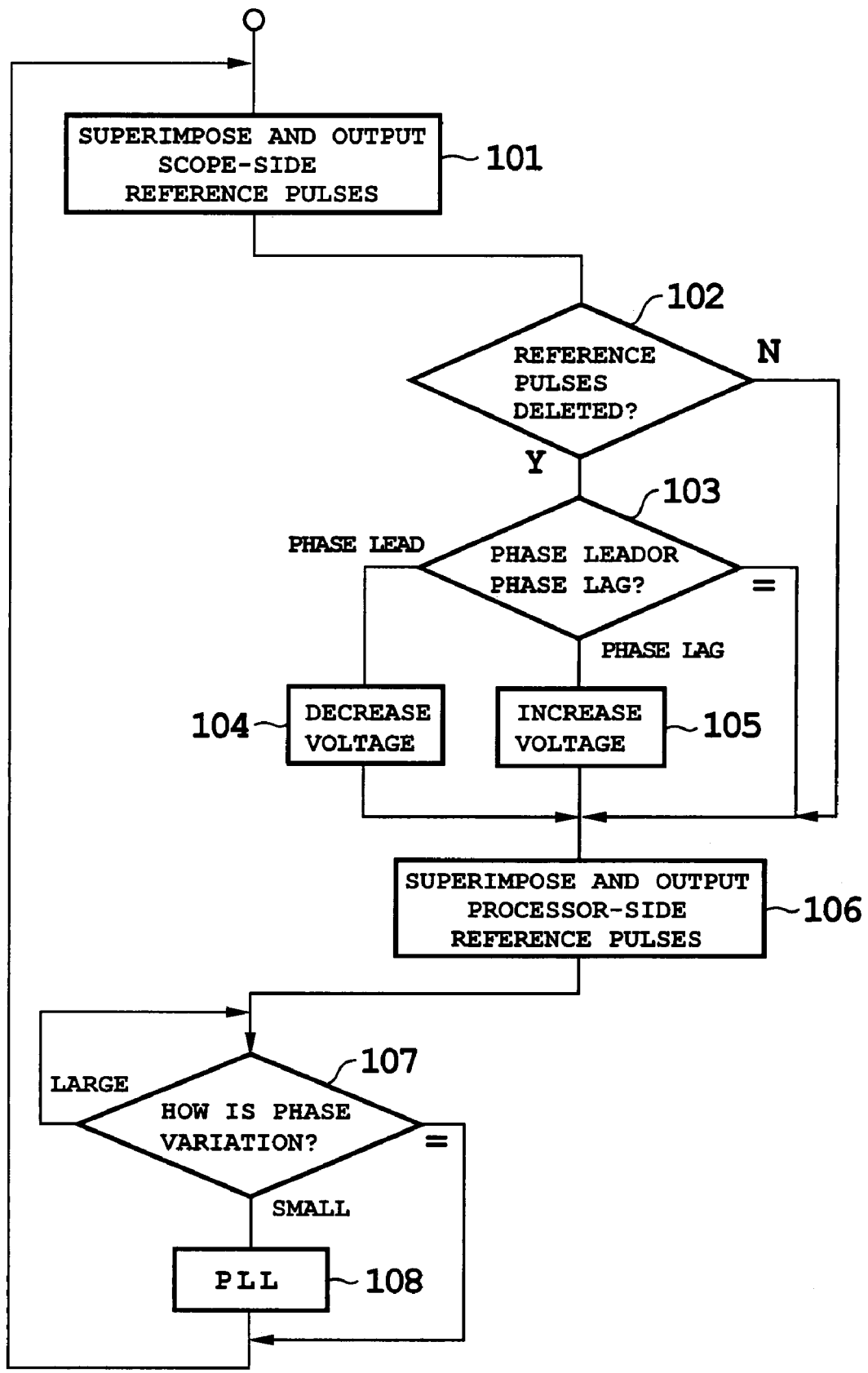
FIG. 4 is flowchart showing synchronizing operations based on reference pulses in the entire electronic endoscope apparatus according to the first embodiment.

FIG. 4 shows synchronizing operations based on both types of reference pulse in the entire apparatus. In Step 101, the scope-side reference pulses Se are superimposed and output from the scope A. In Step 102, the processor unit B judges whether scope-side reference pulses Se have been detected. If the answer is "Y (YES)," the phase comparator circuit 26 compares phases in Steps 103 to 105. Phase adjustment is made based on the result of comparison: if a phase lead is found in Step 103, a control voltage which represents the result of comparison is lowered in Step 104. If a phase lag is found, the control voltage which represents the result of comparison is raised in Step 105. Then, the flow goes to Step 106. If it is found in Step 103 that the reference pulses Se and Sp are in phase with each other, the flow also goes to Step 106. In Step 106, the processor-side reference pulses are output, being superimposed on the transmitted power. If reference pulses are not detected in Step 102 ("N (NO)"), the control voltage is output based on the result of the previous phase comparison.

On the other hand, when the scope A receives the processor-side reference pulses Sp, the phase comparator circuit 18 makes a phase comparison in Step 107. If there is a small phase variation or no phase variation, the PLL operates in Step 108 and then the scope-side reference pulses Se are superimposed and output in Step 101. If a wide phase variation is found in Step 107, phase comparisons are further repeated while waiting for the processor unit B to make phase adjustments by PLL operation.

The state which exists at this time is represented by a horizontal scanning period 9H in FIG. 3. If the phase comparison in the scope A reveals a wide phase variation, since Step 107 is repeated, no reference pulse Se is output during the blanking period Bag of the horizontal line signal $S_{a9}$. Consequently, the answer in Step 102 is "N," and the next processor-side reference pulses Sp are output during the next blanking period $B_{a10}$ of the horizontal scanning period 10H. If the phase of the reference pulses Sp show a small variation, the scope-side reference pulses Se (11H) are output by PLL operation.

Since the scope A according to this embodiment uses the crystal oscillator 19a with a narrow Q-value range as an oscillator, it is difficult to achieve synchronization using PLL operation when there is a wide phase variation. Thus, if there is a large phase variation, the LCR oscillator 27a of the processor unit B is used for its adjustment instead of using PLL operation. The LCR oscillator 27a generally has a wide Q-value range and can perform follow-up control properly even when there is a wide phase variation.

In this way, even if the scope A and processor unit B are equipped with oscillators 19a and 27a which differ in frequency, resulting in clock signals with different frequencies, this embodiment can generate clock signals and other timing signals synchronized properly between the two sides. Also, it can overcome a phase difference between synchronizing clock signals which can occur depending on temperature conditions, the length of the electronic endoscope, etc. This makes it possible to generate timing signals for sampling properly.

The video signal separated by the waveform separating circuit 25 of the processor unit B in FIG. 1 has been supplied to the CDS circuit 32, and now correlated double sampling is performed using the timing signals. Specifically, as in the case of FIG. 5, a correlated double sampling and holding process is performed on the output signal of the CCD 12 using the timing signals synchronized properly with the scope-side reference pulses Se to form an image signal by picking up an amplitude envelope of pixel signals accurately.

The output from the CDS 32 is converted into a digital signal and subjected to various types of color video processing by means of DSP 34. The image signal thus formed is converted into an analog signal and supplied to a monitor via the amplifier 37 to display color images of the object under observation on the monitor.

According to the first embodiment described so far, the scope-side reference pulses Se are superimposed first and then the processor-side reference pulses Sp are superimposed in each field. Alternatively, it is possible to superimpose the processor-side reference pulses. Sp first and then superimpose the scope-side reference pulses Se. In the case of non-interlaced scanning, the scope-side reference pulses Se and processor-side reference pulses Sp are superimposed alternately in each frame. Contrary to the first embodiment, it is possible to install an LCR oscillator in the scope A, and a crystal oscillator in the processor unit B.

Furthermore, in this example, even when a scope equipped with a 410,000-pixel CCD is used, by performing similar synchronizing operations, it is possible to overcome a phase difference of the reference pulses which can occur depending on temperature conditions, the length (transmission channel) of the electronic endoscope, etc. and obtain accurate synchronizing signals. Incidentally, it is also possible to connect the common power/signal line 10 to a light source unit for supplying an illuminating beam, supply power to the scope A from the light source unit, and transmit signals to and from the processor unit B.

As described above, the first embodiment allows the power line and signal line to be integrated into, for example, a single coaxial cable by which the electronic endoscope and processor unit can be connected. This eliminates bad connections etc. of pins and reduces manufacturing costs. Also, it is possible to obtain timing signals synchronized precisely within a field or frame, and thus to form and display images of the object under deservation in good condition by means of accurate sampling and holding even when various scopes equipped with CCDs with different pixel counts are connected to a processor unit.

Second Embodiment

Figure 5:
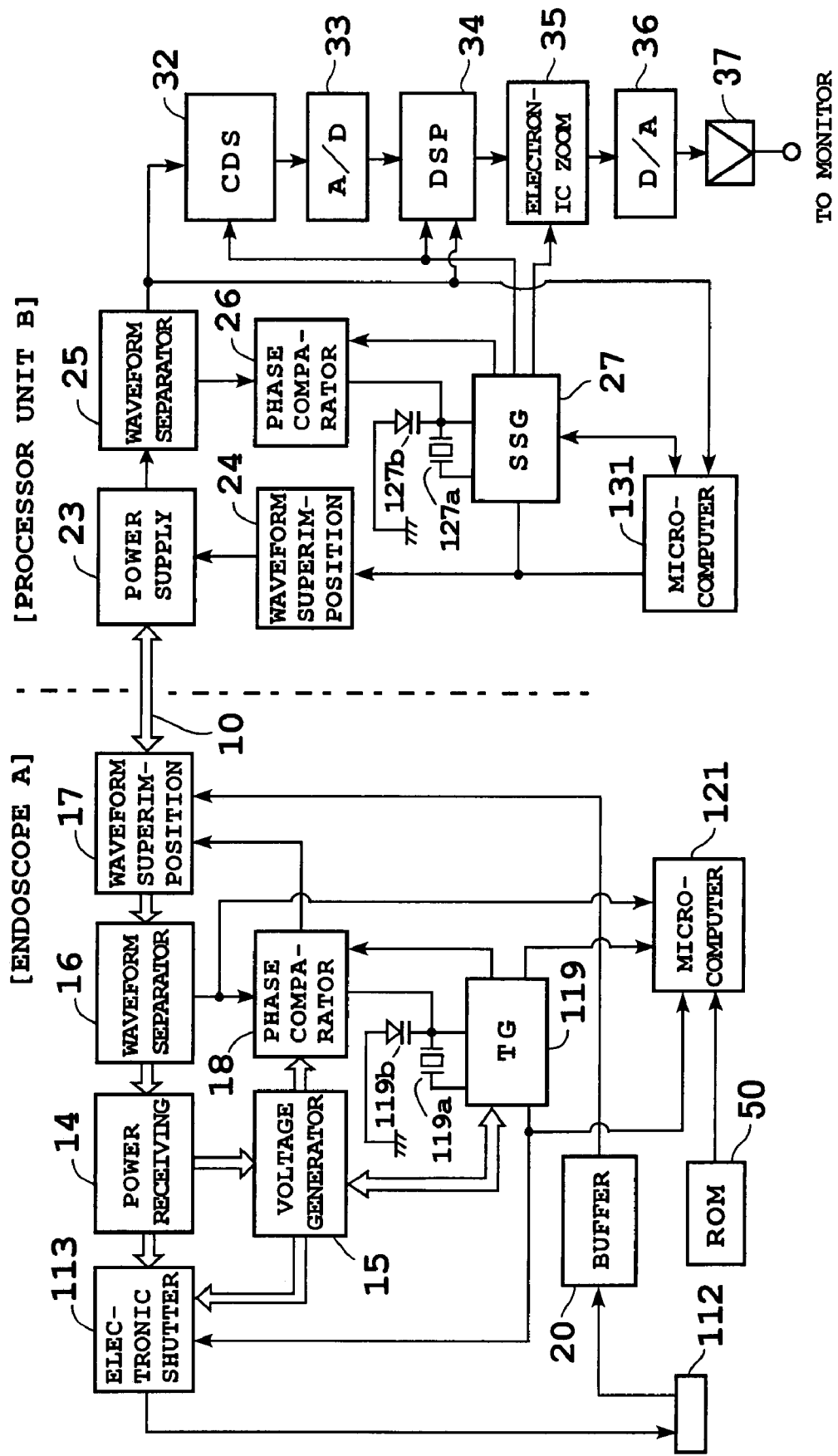
FIG. 5 is a block diagram showing configuration of an electronic endoscope apparatus according to the second embodiment.

FIG. 5 shows configuration of an electronic endoscope apparatus according to a second embodiment. The basic configuration is similar to that of the first embodiment. The tip of the scope A is equipped with, for example, a 410,000-pixel CCD 112 and an electronic shutter circuit 113. The electronic shutter circuit 113 drives the CCD 112, sets the number of sweep-out pulses (SUB pulses) for sweeping out charge accumulated in the CCD 112, and thereby variably controls charge accumulation time (exposure time) for actual charge accumulation as electronic shutter speed.

Also, the scope A is equipped with a power receiving circuit 14, voltage generating circuit 15, waveform separating circuit 16, and waveform superimposing circuit 17. The waveform superimposing circuit 17 waveform-superimposes the video signal on transmitted power. Also, it superimposes scope-side reference pulses on the blanking period of the first horizontal line signal in the first field of the video signal, and a scope information signal about the scope A on blanking periods of the second and later horizontal line signals in the first field. The scope information includes various information about the type of the scope A, pixel count of the CCD 112, processing of color signals, etc.

Furthermore, a timing generator 119 installed together with the phase comparator circuit 18 is equipped with a crystal oscillator 119a which oscillates at a frequency of 28.6363 MHz for driving a 410,000-pixel CCD 112 as well as with a variable-capacitance diode 119b. Also, it outputs a 28.6363 MHz clock signal as the scope-side reference pulses and functions as a synchronizing signal generating circuit in conjunction with the phase comparator circuit 18. Besides, the scope A further comprises a microcomputer 121 which generally controls various circuits of the scope A; EEPROM 50 which stores the scope information about the scope A including information about the type of electronic endoscope and pixel count, processing of color signals; etc. The scope information signal is supplied to the waveform superimposing circuit 17 by the microcomputer 121.

On the other hand, the processor unit B is equipped with a power supply circuit 23; waveform superimposing circuit 24 which superimposes waveforms of control signals for the electronic shutter speed and the like on the transmitted power on blanking periods in the second field; waveform separating circuit 25 which separates the video signal, scope-side reference pulses, and scope information signal; phase comparator circuit 26; and synchronizing signal generator (SSG) 127. The synchronizing signal generator 127 is equipped with a crystal oscillator 127a which generates a frequency of 28.6363 MHz for driving, for example, a 410,000-pixel CCD as well as with a variable-capacitance diode 127b. It feeds the output voltage of the phase comparator circuit 26 to the junction of the crystal oscillator 127a and variable-capacitance diode 127b, forms a PLL, and thereby generates a clock signal, horizontal synchronizing (HD) signal, vertical synchronizing (VD) signal, etc. in synchronization with the scope-side reference pulses.

Also, the processor unit B is equipped with a microcomputer 131, correlated double sampling circuit 32, A/D converter 33, DSP circuit 34, D/A converter 36, amplifier 37, etc. Besides, the processor unit B according to the second embodiment comprises an electronic zoom circuit 35 which zooms in and out images electronically.

In the second embodiment, configured as described above, when the processor unit B is powered on, DC power is supplied to the scope A via the coaxial cable 10. Then, the DC power is supplied to the electronic shutter circuit 113, which drives the CCD 112 to capture images of an object under observation. The video signal is superimposed on the transmitted power (70) by the waveform superimposing circuit 17. In the meantime, approximately ten reference pulses for the scope (a clock signal with a frequency of 28.6363 MHz) are superimposed on the blanking period of the first horizontal line signal in the first field of the video signal.

FIG. 6 shows part of output from the waveform superimposing circuit 17. For example, if a 12-volt DC power is used, horizontal line signals (part which actually contains the video signal) $S_{a1}, S_{a2}, S_{a3}, \ldots$ of the video signal are superimposed in an inverted state on the supply voltage of 12 volts. Approximately ten reference pulses Se are superimposed on the blanking period $B_{a1}$ of the first horizontal line signal $S_{a1}$ in the first field (an odd-numbered field) of the video signal (FIG. 8).

Figure 8:
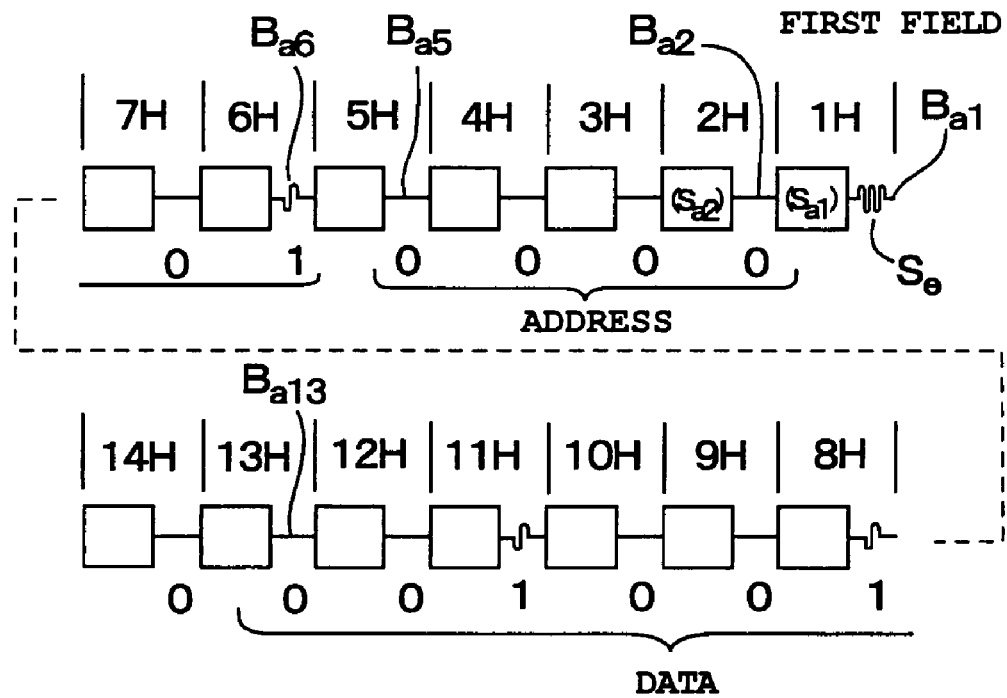
FIG. 8 is a diagram showing a signal in the first field of a video signal superimposed on transmitted power according to the second embodiment.

Also in the second embodiment, as shown in FIG. 8, the scope information is waveform-superimposed on blanking periods of the second and later horizontal line signals (2H–$S_{a2}$) in the first field by the waveform superimposing circuit 17 under the control of the microcomputer 121. As shown in FIG. 7, if it is assumed that the EEPROM 50 stores the scope information including information about the type of scope A, pixel count of the CCD 112, processing of color signals, etc. as 8-bit data at addresses 0, 1, 2, ..., 1-bit data in which each pulse represents either "1" or "0" have their waveform superimposed on every blanking period of each horizontal line signal. Specifically, as shown in FIG. 8, for example, data "0, 0, 0, 0" which represents address 0 have their waveform superimposed on the blanking periods $B_{a2}$ to $B_{a5}$ of the second 2H to fifth horizontal line signal 5H (rectangles represent the actual video signal) while scope data "1, 0, 1, 0, 0, 1, 0, 0" have their waveform superimposed in sequence on the blanking periods $B_{a6}$ to $B_{a13}$ of the sixth 6H to thirteenth horizontal line signal 13H.

On the other hand, the waveform separating circuit 25 of the processor unit B separates an AC component supplied via the coaxial cable 10 and supplies the video signal containing the horizontal line signals $S_{a1}, S_{a2}, S_{a3}, \ldots$ to the CDS 32, where the scope-side reference pulses Se separated from the first blanking period $B_{a1}$ is supplied to the synchronizing signal generator 27 via the phase comparator circuit 26. Timing signals such as a clock signal a horizontal synchronizing signal and vertical synchronizing signal are generated in synchronization with the reference pulses Se, supplied to the CDS 32 and other circuits, and subjected to video processing in the circuits from the CDS 32 to the amplifier 37.

Also, the waveform separating circuit 25 separates the scope information signal from the blanking periods $B_{a2}$ to $B_{a13}$ and $B_{a14} \ldots$ of the second 2H and subsequent horizontal line signals in FIG. 5 and supplies it to the microcomputer 131. Based on the scope information, the microcomputer 131 controls video processing in a manner suited to the connected scope A. Even if another type of scope A is connected, processing appropriate to the characteristics of the scope is performed properly.

Furthermore, the electronic shutter circuit 113 of the scope A according to this embodiment adjusts the brightness of video by regulating electronic shutter speed variably and supplies a control signal for the electronic shutter speed from the processor unit B to the scope A via the coaxial cable 10. Specifically, the DSP circuit 34 detects a photometric signal or luminance signal of the current video signal, and the control signal for the electronic shutter speed is supplied to the microcomputer 131 to keep the brightness of the video constant based on this signal. Consequently, the control signal for the electronic shutter speed is superimposed on a blanking period in the second field over the power via the waveform superimposing circuit 24.

Figure 9:
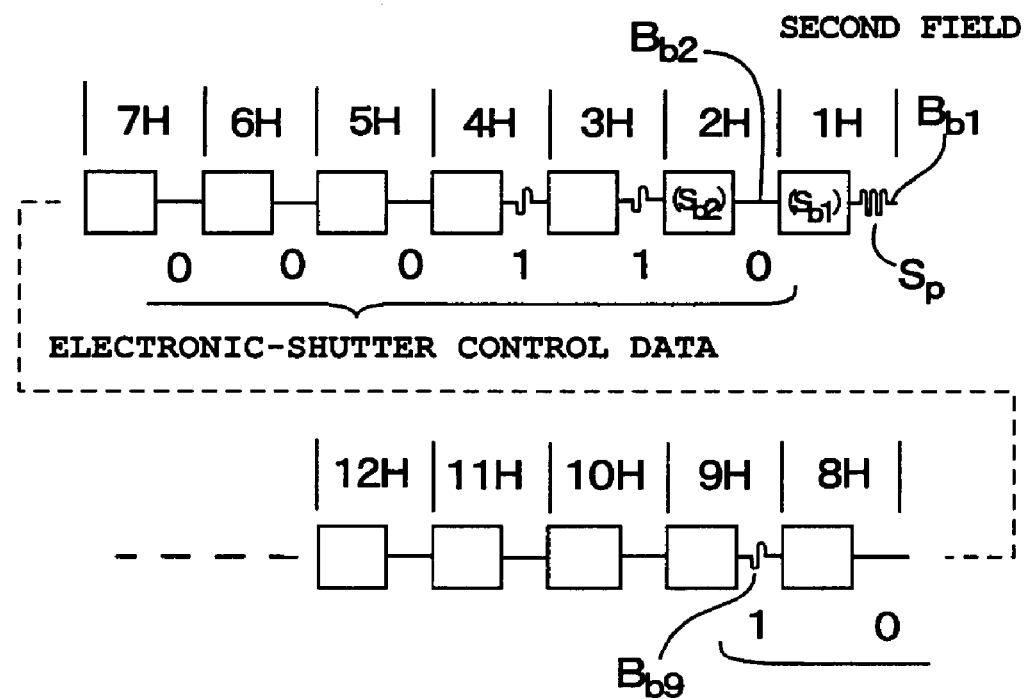
FIG. 9 is a diagram showing signals in the second field of a video signal superimposed on transmitted power according to the second embodiment.

For example, the control signal for the electronic shutter speed is 8-bit data which represent the number of sweep-out pulses (e.g., 0 to 252) synchronized with a horizontal synchronizing signal and as shown in FIG. 9, electronic shutter speed control data "0, 1, 1, 0, 0, 0, 0, 1" are superimposed in sequence on the blanking periods $B_{b2}$ to $B_{b9}$ of the second 2H ($S_{b2}$) to ninth horizontal line signal 9H in the second field.

Then, the waveform separating circuit 16 of the scope A separates the electronic shutter speed control signal from the power supplied via the coaxial cable 10 and sends it to the electronic shutter circuit 113 via the microcomputer 121. Consequently, the electronic shutter circuit 113 controls sweep-out time of accumulated charge using a sweep-out pulse count which constitutes the electronic shutter speed control signal and controls the charge accumulation time after the sweep-out as the electronic shutter speed.

Thus, the processor unit B performs video processing based on the scope-side reference pulses Se and scope information supplied via the coaxial cable 10 which is a common power/signal line and the scope A performs exposure time control based on the electronic shutter speed control signal supplied via the coaxial cable 10, making it possible to display images of the object under observation on the monitor in good condition.

Again, the second embodiment can accommodate scopes A with different pixel counts to be connected. If as is the case with the first embodiment, the scope A is equipped with a 270,000-pixel CCD 12 while the processor unit B is configured to handle 410,000-pixel image pickup devices as standard, clock signals with different frequencies are used and it is not enough to synchronize the processor unit B with the scope-side reference pulses Se alone. In other words, the approximately ten reference pulses will have their waveform distorted after being transmitted from the scope A to the processor unit B or after passing through a transformer. This makes it impossible to achieve proper synchronization.

To deal with this situation, the synchronizing signal generator 127 of the processor unit B shown in FIG. 5 generates a frequency of 19.0909 MHz by dividing a oscillation frequency of 28.6363 MHz at a ratio of 2/3 and sends it as the processor-side reference pulses Sp to the scope A via the coaxial cable 10 to allow the scope A to be synchronized with the processor-side reference pulses as well. That is, the waveform superimposing circuit 24 superimposes approximately ten processor-side reference pulses Sp on the blanking period $B_{b1}$ of the first horizontal line signal $S_{b1}$ in the second field (an even-numbered field) of the video signal as shown in FIG. 6.

The timing generator 119 of the scope A generates a signal synchronized with the processor-side reference pulses Sp separated by the waveform separating circuit 16. Since the superimposition location of the processor-side reference pulses Sp is known to be the first horizontal line signal $S_{b1}$ in the second field, horizontal scanning and vertical scanning can be synchronized with the pulses Sp.

In this way, the processor unit B is synchronized with the scope-side reference pulses Se superimposed on the first horizontal line signal in the first field while the scope A is synchronized with the processor-side reference pulses Sp superimposed on the first horizontal line signal in the second field, enabling stable signal synchronization without waveform distortion.

In the above example, the frequency 19.0632 MHz of the scope-side reference pulses Se and the frequency 19.0909 MHz of the processor-side reference pulses Sp differ from each other, resulting in a slight contraction of the horizontal width, but this is corrected by the electronic zoom circuit 35. Specifically, in an image memory in the electronic zoom circuit 35, image data written in synchronization with the scope-side reference pulses Se can be read, timed with the horizontal synchronizing signal of approximately 63.5 μsec generated from the oscillation frequency of 28.6363 MHz, to correct the horizontal width.

In the second embodiment, the scope information signal are superimposed on blanking periods of the second and later horizontal line signals in the first field while the electronic shutter speed control signal is superimposed on blanking periods of the second and later horizontal line signals in the second field, but the locations of superimposition may be changed as desired. Also, in the first embodiment, part of the reference pulses Se and Sp superimposed alternately on every other horizontal scanning period may be replaced by the superimposition of the scope information signal and electronic shutter speed control signal.

In the case of non-interlaced scanning, it is possible to superimpose the scope-side reference pulses Se on the blanking period of the first horizontal line in the first frame, the scope information signal on blanking periods of the second and later horizontal line signals in the first frame, the processor-side reference pulses Sp on the blanking period of the first horizontal line in the second frame, and the electronic shutter speed control signal on predetermined blanking periods of the first and later horizontal line signals in the second frame.

Contrary to the above embodiment, the processor-side reference pulses Sp may be superimposed on the blanking period $B_{a1}$ of the first horizontal line $S_{a1}$ in the first field (or first frame) and the scope-side reference pulses Se may be superimposed on the blanking period $B_{b1}$ of the first horizontal line signal $S_{b1}$ in the second field (or second frame).

Third Embodiment

Figure 10:
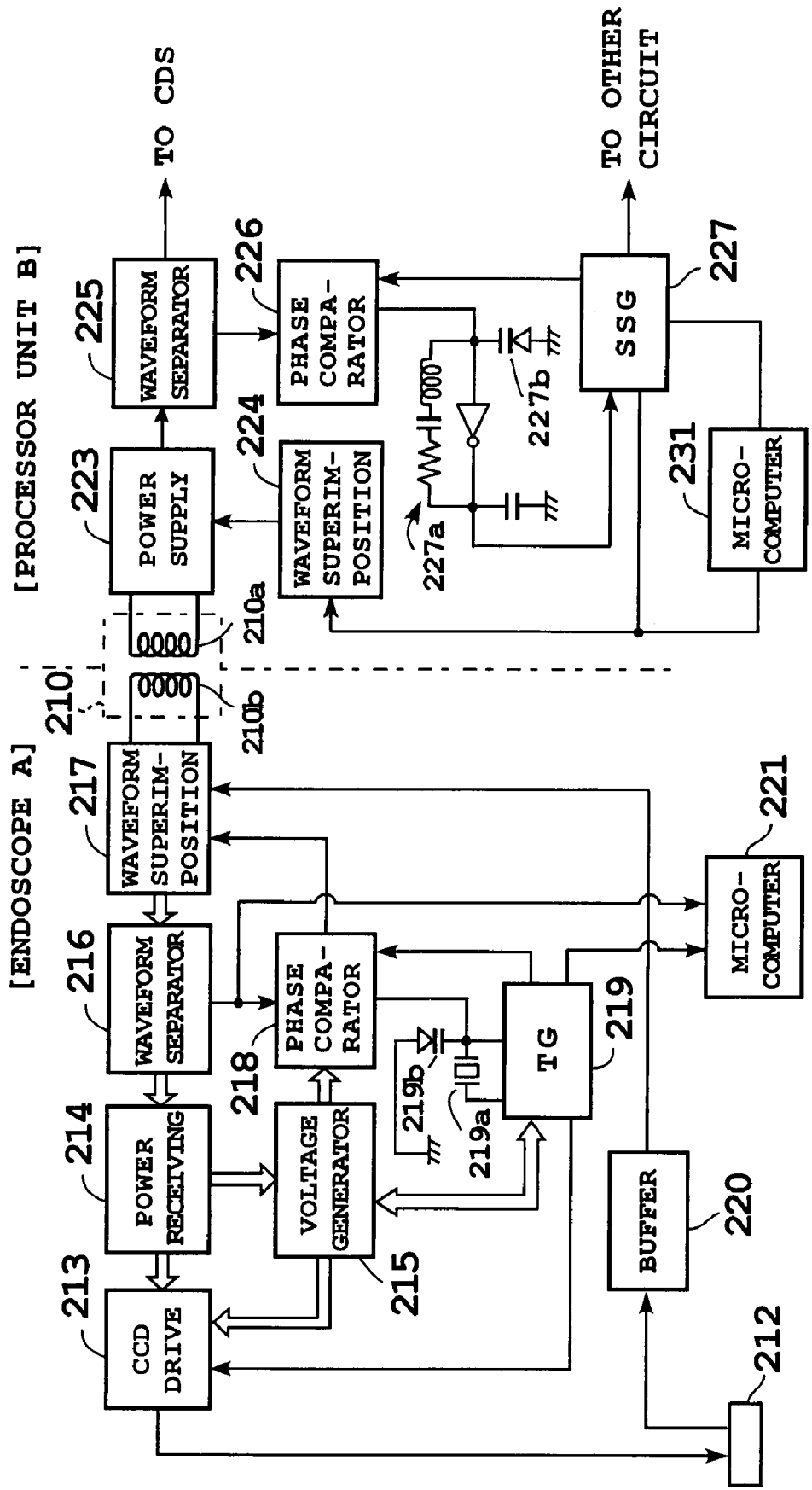
FIG. 10 is a block diagram showing configuration of an electronic endoscope apparatus according to a third embodiment.

FIG. 10 shows configuration of an electronic endoscope apparatus according to a third embodiment. The third embodiment uses an electromagnetic coupler in a similar configuration with the first embodiment. Specifically, instead of the coaxial cable 10, an electromagnetic coupler 210 is used for electromagnetic coupling. The electromagnetic coupler 210 comprises a primary winding 210a on the side of the processor unit B and a secondary winding 210b on the side of the scope A, placed at a predetermined interval. Alternatively, it is possible to install the electromagnetic coupler 210 in an optical connector connecting the light source unit to the scope A, supply AC power from the light source unit, and transmit the video signal and the like through a signal line connecting the light source unit and processor unit.

The scope A is equipped with a CCD 212 with a pixel count of 270,000, CCD drive circuit 213, power receiving circuit 214 which converts alternating current (AC) into direct current (DC), voltage generating circuit 215, waveform separating circuit 216 which separates AD power and processor-side reference pulses supplied through the electromagnetic coupler 210, waveform superimposing circuit 217, phase comparator circuit 218, and timing generator 219.

On the other hand, the processor unit B is equipped with a power supply circuit 223 which supplies AC power to the scope A via the electromagnetic coupler 210, waveform superimposing circuit 224, and waveform separating circuit 225, high pass filter (HPF) or band pass filter (BPF), which separates AC components—the video signal and scope-side reference pulses. The HPF or BPF in the waveform separating circuit 225 may be, for example, a filter which allows a frequency band of 14.32±1.79 MHz to pass. Besides, the processor unit B comprises a phase comparator circuit 226, synchronizing signal generator (SSG) 227, and microcomputer 231.

Figure 11:
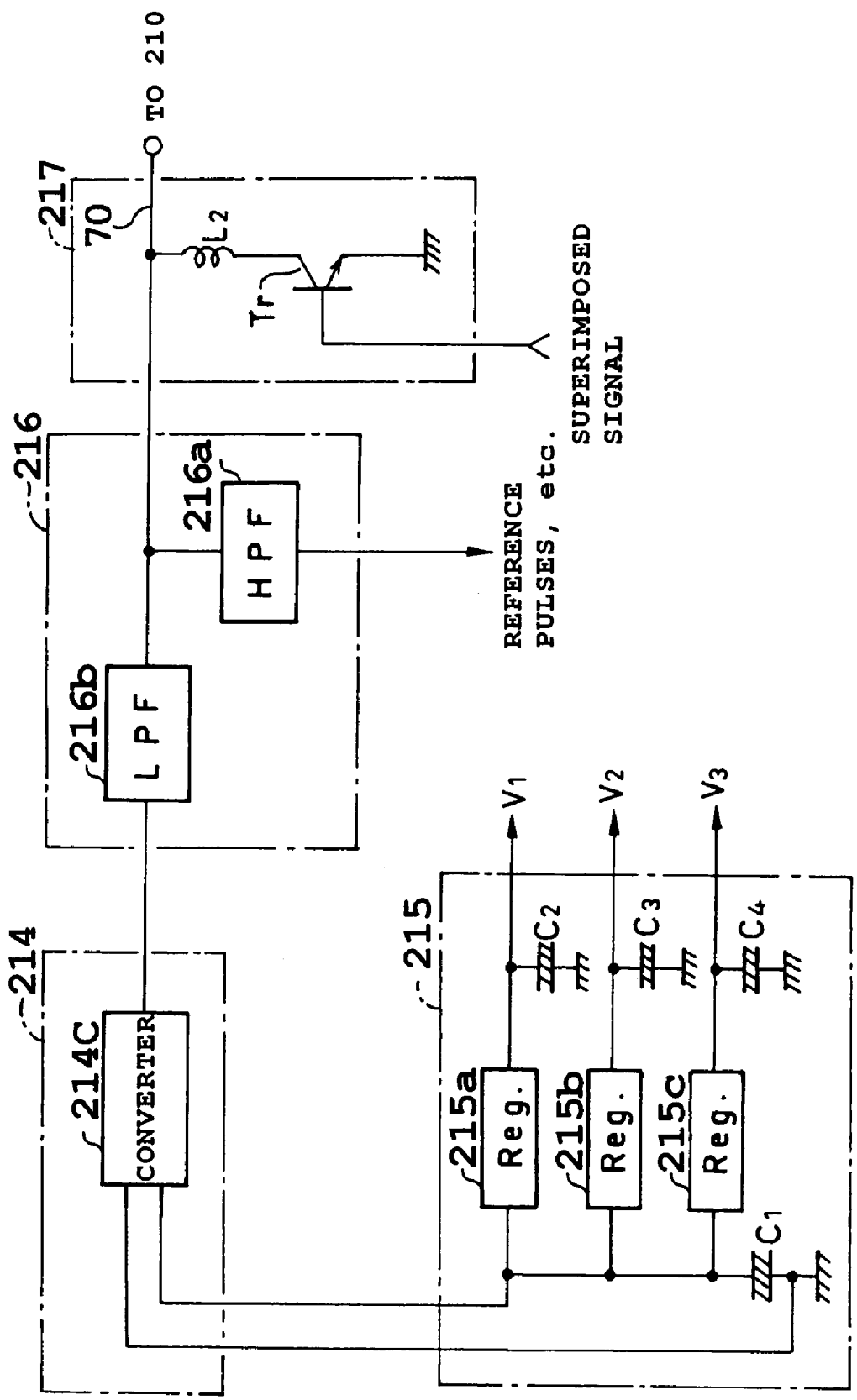
FIG. 11 is a diagram showing a concrete configuration of a power receiving circuit, voltage generating circuit, waveform separating circuit, and waveform superimposing circuit according to the third embodiment.

FIG. 11 shows concrete circuits from the power receiving circuit 214 to the waveform superimposing circuit 217 of the scope A. The waveform superimposing circuit 217 consists of a coil $L_2$ and transistor Tr connected between a common power/signal line 70 connected to the electromagnetic coupler 210 and the ground. The base of the transistor Tr is supplied with superimposed signals—the video signal and reference clock pulses from the timing generator 219. The waveform separating circuit 216 has a high pass filter (HPF) 216a and low pass filter (LPF) 216b. The HPF 216a passes a frequency band of, for example, 4.32±1.79 MHz and separates signal components supplied through the electromagnetic coupler 210, i.e., the processor-side reference pulses and control signals. The LPF 216b passes a power supply frequency of 50 Hz or 60 Hz and separates the AC power supplied through the electromagnetic coupler 210.

The power receiving circuit 214 is equipped with a converter 214C to convert the AC power separated by the LPF 216b into DC power. The voltage generating circuit 215 is equipped with switching regulators 215a, 215b, and 215c to generate, for example, DC voltages $V_1$, $V_2$, and $V_3$ needed in the scope A. Incidentally, the configuration of the waveform superimposing circuit 217 similarly applies to the waveform superimposing circuit 224 in the processor unit B.

In the third embodiment, configured as described above, when the processor unit B is powered on, AC power is supplied from the power supply circuit 223 to the scope A via the electromagnetic coupler 210. Then, the waveform separating circuit 216 of the scope A extracts the AC power. The AC power is supplied to the power receiving circuit 214 and converted there into DC power by the converter 214C. Consequently, the DC power is supplied to the voltage generating circuit 215, which then produces DC power supplies ($V_1$, $V_2$, and $V_3$) using the switching regulators 215a, 215b, and 215c and provides them to various circuits.

Figure 12:
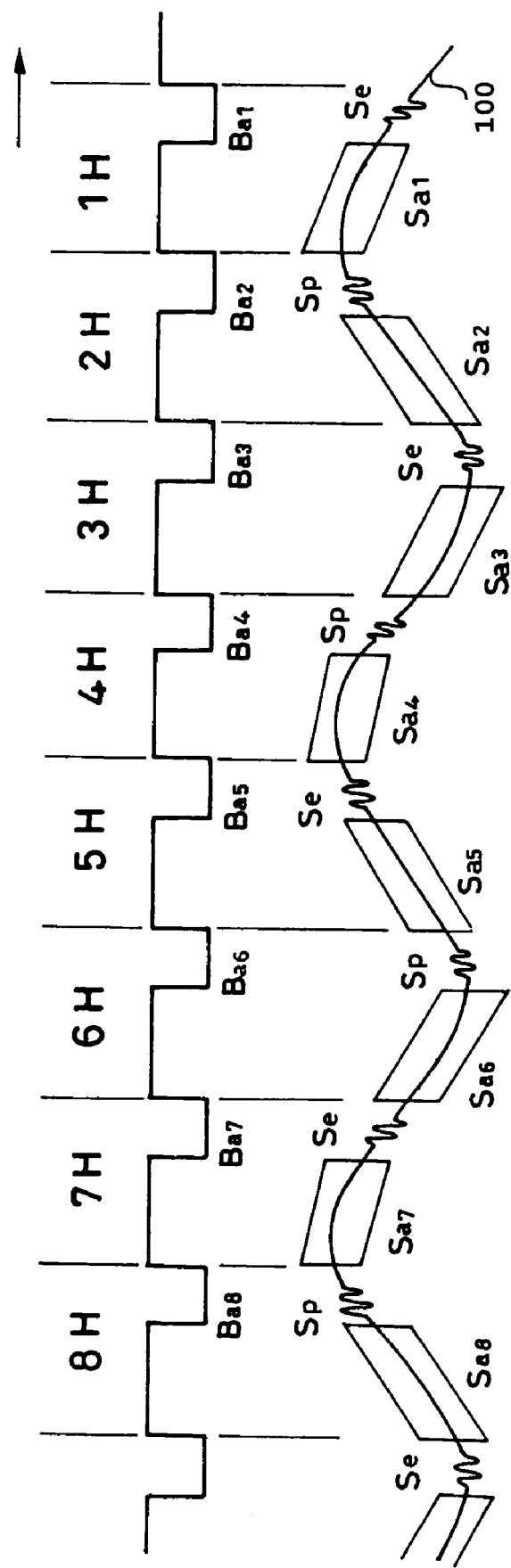
FIG. 12 is a diagram showing how transmission signals are superimposed on AC power by the waveform superimposing circuit according to the third embodiment.
Figure 13:
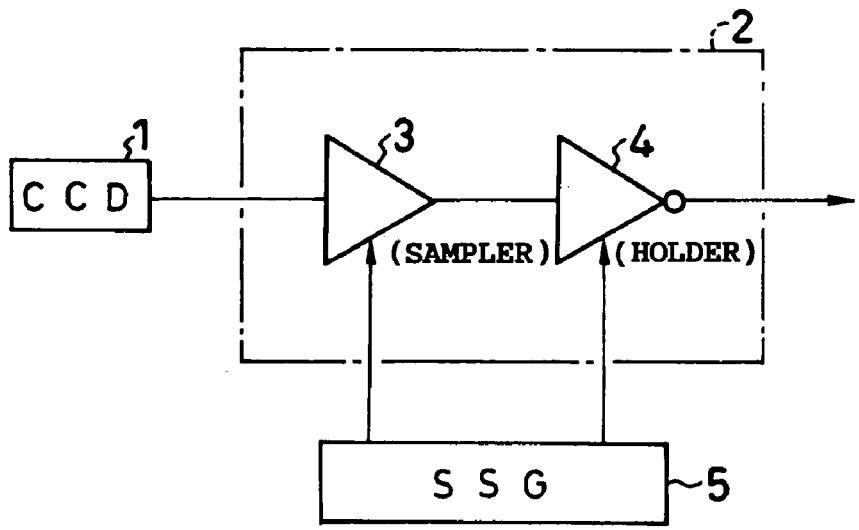
FIG. 13 is a diagram showing configuration for sampling of CCD image pickup signals.
Figure 14A:
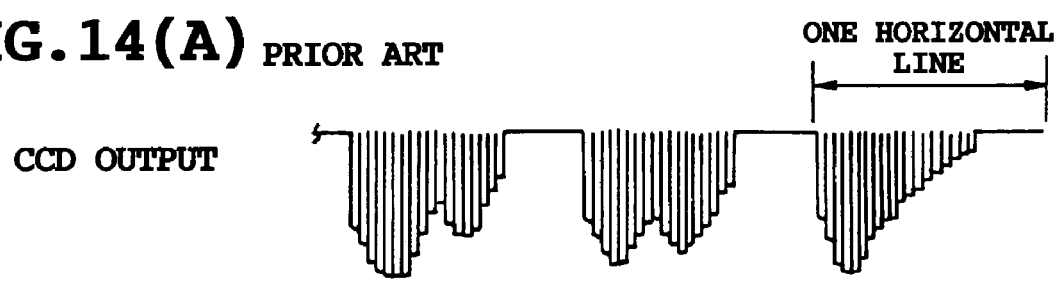
FIGS. 14A and 14B are waveform charts showing sampling of CCD image pickup signals.
Figure 14B:
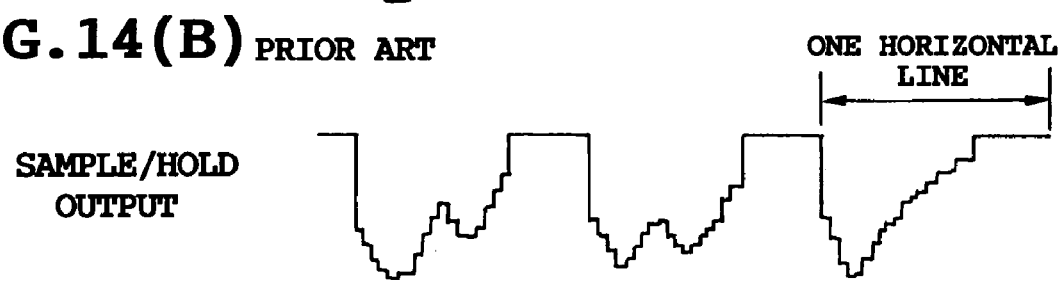

The video signal from the CCD 212 shown in FIG. 10 is superimposed on the AC power by the waveform superimposing circuit 217 while the scope-side reference pulses Se and processor-side reference pulses Sp are superimposed on a horizontal scanning blanking period of the video signal. Specifically, as shown in FIG. 12, the video signal (rectangles represent the actual video signal) consisting of horizontal line (scanning) signals $S_{a1}$, $S_{a2}$, $S_{a3}$, . . . in horizontal scanning periods 1H, 2H, 3H, is superimposed on the AC power (waveform 100) on a field-by-field basis. At the same time, the scope A superimposes approximately ten 19.0632-MHz reference pulses Se for the scope, for example, on the blanking periods $B_{a1}$, $B_{a3}$, $B_{a5}$, . . . of horizontal line signals $S_{a1}$, $S_{a3}$, $S_{a5}$, . . . in the field while the processor unit B superimposes the reference pulses Sp with a frequency of 19.0909 MHz (obtained by dividing an oscillation frequency of 28.6363 MHz at a ratio of 2/3) composed of approximately ten pulses on the blanking periods $B_{a2}$, $B_{a4}$, $B_{a6}$, ... of the horizontal line signals $S_{a2}$, $S_{a4}$, $S_{a6}$, The waveform separating circuit 216 of the scope A separates the reference pulses Sp transmitted via the electromagnetic coupler 210 while the phase comparator circuit 218 and timing generator 219 form a signal in synchronization with the reference pulses Sp using PLL operation. On the other hand, the waveform separating circuit 225 of the processor unit B separates the video signal and reference pulses Se supplied via the electromagnetic coupler 210 while the phase comparator circuit 226 and synchronizing signal generator circuit 227 form a signal synchronized with the reference pulses Se using PLL operation. Then, based on the signals synchronized with the reference pulses, timing signals are generated, including clock signals, next reference pulses, and horizontal and vertical synchronizing signals. In this way, the scope A and processor unit B achieve stable signal synchronization without waveform distortion and perform various types of processing properly based on respective timing signals.

The third embodiment, which employs the electromagnetic coupler, can provide electrical isolation between the electronic endoscope and processor unit, and thus has the advantage of being able to simplify configuration by eliminating conventional isolation means.

What is claimed is:

1. An electronic endoscope apparatus comprising:
   an electronic endoscope equipped with an image pickup device;
   a main unit which is connected with the electronic endoscope and includes a processor unit;
   a common power/signal line which connects the electronic endoscope with the main unit;
   a power supply circuit which is installed in the main unit and supplies power to the electronic endoscope via the common power/signal line;
   a scope-side waveform superimposing circuit which superimposes a video signal obtained by the image pickup device on power transmitted through the common power/signal line and superimposes an information signal about the electronic endoscope on a predetermined blanking period in the video signal;
   a processor-side separating circuit which separates the video signal and the information signal about the electronic endoscope superimposed on the common power/signal line; and
   a signal processing circuit which performs various types of processing on the video signal based on the information signal about the electronic endoscope obtained from the processor-side separating circuit.

2. The electronic endoscope apparatus according to claim 1, comprising:
   an electronic shutter circuit which controls charge accumulation time in the image pickup device as electronic shutter speed;
   a processor-side waveform superimposing circuit which superimposes an electronic shutter control signal on a predetermined blanking period in the video signal supplied through the common power/signal line; and
   a scope-side separating circuit which separates the electronic shutter control signal superimposed on the common power/signal line.

3. The electronic endoscope apparatus according to claim 2, wherein the scope-side waveform superimposing circuit superimposes scope-side reference pulses on a blanking period of the first horizontal line in the first field or first frame of the video signal and superimposes the information signal about the electronic endoscope on predetermined blanking periods of the second and later horizontal lines in the first field or first frame while the processor-side waveform superimposing circuit superimposes the electronic shutter control signal on a predetermined blanking period in the second or later field or frame of the video signal.

4. The electronic endoscope apparatus according to claim 1, comprising:
   an electromagnetic coupler which is installed instead of the common power/signal line and connects the electronic endoscope and the main unit electromagnetically; and
   a power supply circuit which is installed in the main unit and supplies AC power to the electronic endoscope via the electromagnetic coupler,
   wherein the video signal, scope-side reference pulses, and processor-side reference pulses are superimposed on the AC power.

* * * * *